IMPULSE-GOVERNED OSCILLATOR

Filed Feb. 28, 1956 2 Sheets-Sheet 1

INVENTOR.
WILLIAM S. ELLIOTT
BY Moody and Harsha
ATTORNEYS

INVENTOR.
WILLIAM S. ELLIOTT
BY Moody and Harsha
ATTORNEYS

United States Patent Office 2,901,706

Patented Aug. 25, 1959

2,901,706

IMPULSE-GOVERNED OSCILLATOR

William S. Elliott, Cedar Rapids, Iowa, assignor to Collins Radio Company, Cedar Rapids, Iowa, a corporation of Iowa Application February 28, 1956, Serial No. 568,222

2 Claims. (Cl. 331—48)

This invention relates to oscillators and more particularly to impulse-governed oscillator circuits.

With present-day communication systems requiring as many channels in a specific frequency band as possible, close channel spacings are essential. A high degree of stability for each channel frequency must also be provided. The stability requisite has led to the use of crystal control of the channel frequencies. The result has been that many crystals are required for each system to insure the proper number of channels. Impulse-governed oscillators have been developed to save crystals in modern communication systems. Impulse-governed oscillators permit the stability of a single crystal to produce many stable frequencies. The resultant frequencies are as stable as the crystal frequency.

Impulse-governed oscillators are essentially spectrum generators and frequency multipliers. Frequency multipliers normally require several stages to develop sufficient output voltage while impulse-governed oscillators may develop sufficient output voltage in a single stage. Impulse-governed oscillators operate on a periodic phase control of a variable oscillator. The output of the oscillator is a spectrum of harmonically related frequencies with the envelope being peaked at the tank circuit frequency. The oscillations are dampened by the pulse-controlled decrease of trans-conductance of the oscillator tube. This results in positive damping of the tuned circuit.

It is an object of this invention to design an impulse-governed oscillator circuit which is extremely stable in its frequency control and which has a sufficient output voltage.

It is a further object of this invention to provide a new and novel impulse-governed oscillator circuit which is simple and economical to construct.

It is a still further object of this invention to produce variations in impulse-governed oscillator circuits which increase the stability of the output frequencies and decrease the complexity of the circuit design.

It is a feature of this invention that two oscillators are combined so that an output frequency spectrum of exact harmonics of the crystal-controlled oscillator are produced. It is a further feature of this invention that this output spectrum be located about the non-crystal oscillator frequency.

These and other objects of this invention will become apparent when the following description is read in conjunction with the accompanying drawings, in which Figure 1 is a representation of the output voltage of the impulse-governed oscillators of this invention.

Figure 1:
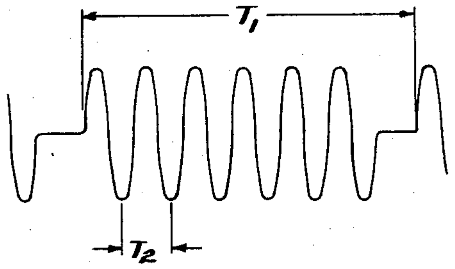

Referring to Figure 1, $T_1$ equals $1/F_1$ where $F_1$ is the crystal oscillator frequency, $T_2$ equals $1/F_2$ where $F_2$ is the free-running oscillator frequency.

Figure 3:
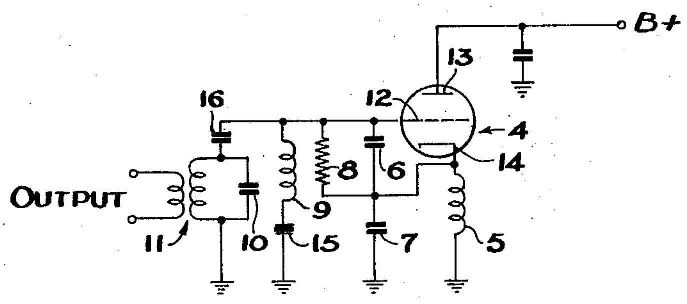
Figure 3 is a schematic representation of a novel impulse-governed oscillator circuit.

Referring now specifically to Figure 3, an impulse-governed oscillator circuit using a single triode tube is shown. The circuit shown in Figure 3 includes both a crystal-controlled oscillator and a free-running oscillator. The crystal-controlled oscillator includes the crystal 15, the inductance 9, and the tube 4. The free-running oscillator is a circuit including the inductance 11, the capacitance 10, the capacitance 16, and the tube 4.

The grid current which flows in the crystal oscillator described above is sufficient to quench or dampen out the free-running oscillator. The crystal oscillator dampens this oscillator by developing a grid-to-cathode voltage, which voltage the free-running oscillator depends upon for its operation. The ideal output of Figure 1 is not exactly obtained with the impulse-governed oscillator circuit of Figure 3. In the circuits of this invention, the frequency of the free-running oscillator is much higher than the frequency of the crystal oscillator or quench oscillator. The capacitance 16 has a low reactance at the frequency of the free-running oscillator but a high reactance to the frequency of the crystal oscillator to prevent the shorting out of the crystal impedance. Conversely, inductance 9 has a high reactance at the free-running oscillator frequency to prevent the shorting out of the tuned circuit and a low reactance at the frequency of the crystal oscillator to maintain the crystal oscillator circuit.

Figure 2:
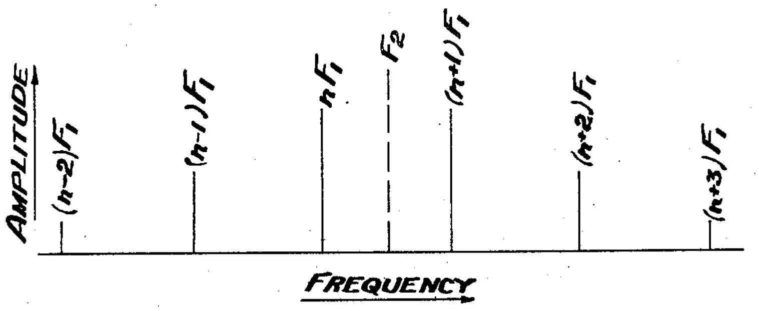
Figure 2 is a representation of the output frequency spectrum of the impulse-governed oscillators of this invention.

The output of the impulse-governed oscillator of Figure 3 varies with the low frequency oscillator voltage or the crystal oscillator voltage, but with proper circuit values the free-running oscillator will be quenched and an output frequency spectrum such as shown in Figure 2 will result. The impulse-governed oscillator circuit of Figure 3 has been constructed using a crystal frequency of 2.15 megacycles and a free-running oscillator frequency of 20 megacycles.

Figure 4:
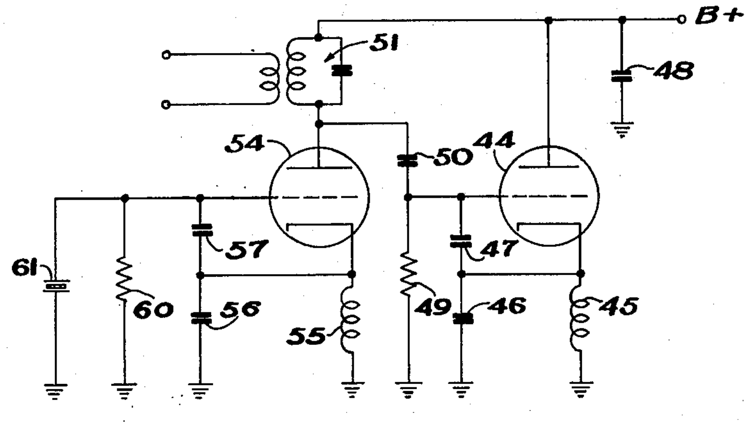
Figure 4 is a representation of another impulse-governed oscillator circuit.

The impulse-governed oscillator circuit of Figure 4 uses two triode tubes and in effect each tube is a part of an oscillator circuit. The free-running oscillator circuit includes tube 44, inductance 45, capacitances 46, 47, and 48, resistance 49, capacitance 50, and tuned circuit 51. The crystal oscillator circuit comprises tube 54, inductance 55, capacitances 56 and 57, resistance 60, and crystal 61. These oscillator sections operate as normal oscillators with the exception that quenching is accomplished when tube 54 draws grid current, thereby placing a load across the tuned circuit 51 equal to the plate resistance of tube 54. To provide a sharp quenching action it is obvious that tube 54 must be a high current tube and a tube with low plate resistance. Each oscillator section provides independently developed bias so that the output of the free-running oscillator is not altered except during the quenching period.

Figure 5:
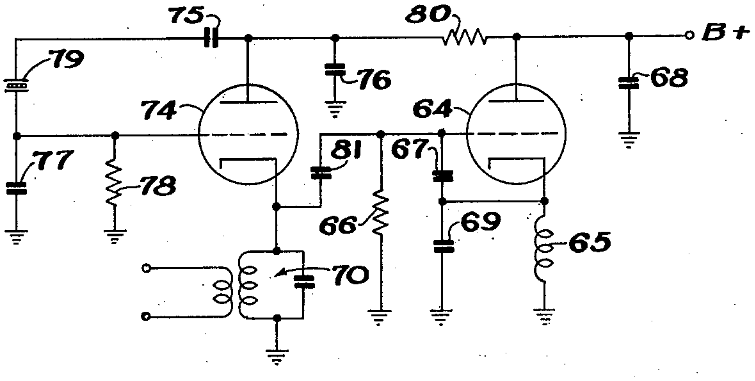
Figure 5 is a schematic representation of a third impulse-governed oscillator circuit.

The impulse-governed oscillator circuit of Figure 5 is also composed of two triode tube oscillator sections. The circuit including tube 64, inductance 65, capacitors 69, 67, 68, and 81, resistance 66, and tuned circuit 70 is a free-running oscillator. The circuit including tube 74, capacitances 75, 76, and 77, resistances 78 and 80, and crystal 79 is the crystal-controlled oscillator circuit. The tuned circuit of the free-running oscillator circuit is placed in the cathode circuit of the tube of the crystal oscillator circuit. The main advantage of the impulse-governed oscillator circuit of Figure 5 over the other impulse-governed oscillator circuits is that it provides a lower resistance across the tuned circuit of the free-running oscillator during the quenching period. During the cut-off period of tube 74 no load is placed across the tuned circuit 70. However, when tube 74 conducts, the free-running oscillator section is presented with a grounded-grid amplifier having no plate load. The impedance of the free-running oscillator circuit across the tuned circuit is then equal to the plate resistance divided by one plus the amplification factor. Thus, by using a high $g_m$ tube, this resistance or impedance can be made very low and the output of the impulse-governed oscillator will approach the ideal output of Figure 1 and Figure 2. The output of the free-running oscillator is substantially independent of the crystal oscillator bias in Figures 4 and 5, and by varying the crystal oscillator circuit the output spectrum may be controlled as to width.

Although this invention has been described with respect to a particular embodiment thereof, it is not to be so limited as changes and modifications may be made therein which are within the full intended scope of the invention as defined by the appended claims.

What is claimed is:

1. An impulse-governed oscillator circuit including a crystal-controlled oscillator circuit comprising a crystal, and an electron tube, a first capacitance connected between the plate of the tube and ground, a second capacitance connected in series with the crystal, and a free-running oscillator circuit comprising a tuned circuit, a second electron tube, an inductor connected between ground and the cathode of the second electron tube, a third capacitor, said free-running oscillator electron tube having its grid coupled to the cathode of said crystal oscillator electron tube through the third capacitor and having said tuned circuit connected between the cathode of said crystal oscillator tube and ground and when the impedance across the tuned circuit is small the oscillations of said free-running oscillator circuit are quenched.

2. An impulse-governed oscillator circuit including a crystal-controlled oscillator circuit and a free-running oscillator circuit, said crystal-controlled oscillator circuit including an electron tube, a crystal, said crystal having one end connected to the plate of said electron tube by a capacitance and the other end to the grid of said electron tube, the grid of said electron tube connected by a resistance and a capacitance to ground, said free-running oscillator circuit including an electron tube and a tuned circuit, the plate of said electron tube connected to the plate of the electron tube of said crystal-controlled oscillator and to positive voltage source, the cathode of said free-running oscillator circuit connected by inductance and capacitance to ground and connected by a capacitance to the grid of said free-running oscillator tube, the grid of said free-running oscillator tube also connected to the cathode of said crystal-controlled oscillator tube and the tuned circuit of said free-running oscillator connected between ground and the cathode of said crystal-controlled oscillator circuit and the grid of said free-running oscillator circuit whereby the free-running oscillator is quenched when grid current flows in the electron tube of the crystal oscillator circuit.

References Cited in the file of this patent

UNITED STATES PATENTS

| | | |
|---|---|---|
| 1,975,615 | Peterson | Oct. 2, 1934 |
| 2,103,655 | Whitaker | Dec. 28, 1937 |
| 2,220,956 | Hansell | Nov. 12, 1940 |
| 2,427,204 | Ferguson | Sept. 9, 1947 |
| 2,455,824 | Tellier et al. | Dec. 7, 1948 |
| 2,643,288 | Philpott | June 23, 1953 |